United States Patent [19]

Pescitelli et al.

[11] Patent Number: 5,845,256

[45] Date of Patent: Dec. 1, 1998

[54] INTERACTIVE SELF-SERVICE VENDING SYSTEM

[75] Inventors: John B. Pescitelli, 200 Old Palisade Ave., Suite 29G, Fort Lee, N.J. 07024; William Sam Schuman, Garfield, N.J.

[73] Assignee: John B. Pescitelli, Staten Island, N.Y.

[21] Appl. No.: 971,763

[22] Filed: Nov. 17, 1997

Related U.S. Application Data

[63] Continuation of Ser. No. 436,642, May 8, 1995, abandoned, which is a continuation of Ser. No. 108,539, Aug. 19, 1993, abandoned.

[51] Int. Cl.⁶ .................................................. G06F 17/60
[52] U.S. Cl. ............................. 705/4; 705/16; 235/381; 364/479.05
[58] Field of Search .................... 705/1, 4, 16, 17, 705/21, 24; 235/375, 380, 381, 383; 364/479.03, 479.05

[56] References Cited

U.S. PATENT DOCUMENTS

| | | |
|---|---|---|
| Re. 32,115 | 4/1986 | Lockwood et al. . |
| 4,276,598 | 6/1981 | Inoue et al. ............................... 395/224 |
| 4,359,631 | 11/1982 | Lockwood et al. ...................... 235/381 |
| 4,491,725 | 1/1985 | Pritchard . |
| 4,493,038 | 1/1985 | Bovio et al. ............................. 395/224 |
| 4,567,359 | 1/1986 | Lockwood ............................... 235/381 |
| 4,648,037 | 3/1987 | Valentino . |
| 4,718,009 | 1/1988 | Cuervo . |
| 4,750,119 | 6/1988 | Cohen et al. . |
| 4,750,121 | 6/1988 | Halley et al. . |
| 4,825,053 | 4/1989 | Caille . |
| 4,831,526 | 5/1989 | Luchs et al. ............................. 364/401 |
| 4,845,636 | 7/1989 | Walker . |
| 4,903,815 | 2/1990 | Hirschfeld et al. ...................... 194/205 |
| 4,965,437 | 10/1990 | Nagai . |
| 4,965,438 | 10/1990 | Murofushi . |
| 4,969,094 | 11/1990 | Halley et al. . |
| 4,970,655 | 11/1990 | Winn et al. ............................... 364/479 |
| 4,972,463 | 11/1990 | Danielson et al. . |
| 4,975,840 | 12/1990 | Detore et al. ............................ 364/401 |
| 4,977,595 | 12/1990 | Ohta et al. . |
| 5,013,897 | 5/1991 | Harman et al. . |
| 5,160,076 | 11/1992 | Ford . |
| 5,160,176 | 11/1992 | Ford ........................................ 285/165 |
| 5,191,522 | 3/1993 | Bosco et al. ............................ 361/401 |
| 5,223,677 | 6/1993 | Kapp et al. .............................. 178/18 |
| 5,448,044 | 9/1995 | Price et al. .............................. 235/380 |

OTHER PUBLICATIONS

Everest, Database Management, McGraw Hill, pp. 745–746. *

Everest, Database Management, McGraw Hill, pp. 745–746, 1986.

*Primary Examiner*—Robert A. Weinhardt
*Attorney, Agent, or Firm*—Richard M. Goldberg

[57] ABSTRACT

A system for vending insurance policies includes stand-alone, interactive self-service terminals coupled to a central office over a communication link. The terminals are normally off-line, but periodically are placed on line for transmitting data to, and updates from, the central office. The terminals, which include a microprocessor, data storage and printers, are programmed to conduct a dialogue with a customer to establish a customer's eligibility, as to age and underwriting criteria, for a policy, quoting premiums, and soliciting a purchase decision. If purchase is elected, the customer's credit is checked and, if approved, a policy application is printed. In one embodiment, customer and company copies are printed and delivered to the customer who is instructed to keep the customer copy, sign the company copy, and direct the signed copy to the company. In a second embodiment, a signature digitizing module is used. The customer is instructed to sign on a pad of the module which digitizes and stores the signature. One copy of the application is printed and delivered to the customer and a signed copy is electronically transmitted to the company over the link or a signed copy is printed internally and kept for later pickup by the company. The terminal stores a lookup table as a continuous data stream, cuts up the data stream, and assembles words corresponding to the customer's age and a chosen coverage option. The customer then selects a term option.

16 Claims, 13 Drawing Sheets

INTERACTIVE SELF-SERVICE VENDING SYSTEM

This application is a continuation of application Ser. No. 08/436,642 filed MAY 8, 1995 now abandoned which is a continuation of application Ser. No. 08/108,539, filed Aug. 19, 1993, now abandoned.

BACKGROUND OF THE INVENTION

1. Field of the Invention

This invention relates to interactive self-service delivery systems and, more particularly, to insurance policy contract vending systems which operate automatically to interact with customers without the active intervention of insurance agents and underwriters, which normally operate off-line to limit line and central office computer time, and which provide a copy of an insurance policy contract signed by the customer to the insurance company.

2. Description of the Prior Art

It is desirable, in implementing the present invention to employ, to the extent possible, existing terminal hardware appropriately adapted and modified to incorporate the principles of the present invention. Hardware suitable for this purpose is sold by NCR. This equipment, a self-service terminal system identified as model NCR 5682, incorporates the data gathering and transaction processing capabilities of conventional automated teller machines with video, graphics, audio and printer operations. Interactivity with the customer is governed by a software system through the use, for example, of a keyboard or an infrared touch screen using prompts. Transactions may be completed through the use of a credit card reader and a PIN number entering means.

As provided, the NCR system is capable of many uses. It is not, however, adapted for vending insurance policies with means to determine the customer's eligibility and insurability. Nor does the NCR system provide means for printing the policy contract, acquiring the customer's signature, delivering a printed policy application to the customer and causing a signed policy application to be provided to the central office. The NCR system also does not provide means for the central office to transmit changes in information as to policy premiums, availability and underwriting criteria for storage in the self-service terminal.

A computerized insurance system is disclosed in U.S. Pat. No. 4,831,526. In this system, insurance agents at remote office on-line terminals communicate with a central processor which includes a data bank, storing data as to risks to be insured, client information, insurance premium information and predetermined text data for incorporation into insurance contracts. An agent at a terminal keys in information regarding a risk and other data needed to write insurance for that risk. To assist him, a "form" is displayed on his terminal by the central processor, and he merely enters the pertinent information in the blanks provided. The information is correlated in the central processor, from which a premium quotation is transmitted back and displayed at the agent's terminal and in which a client data base is established with the information from the form. Errors or omissions are detected and the agent or client is notified. If the policy is to be written, a formal contract is printed under the control of the central processor and electronically stored and displayed to underwriter personnel. Concurrently the insurance contract is mailed to the client. The underwriter can decide to cancel or alter the contract. Alternatively, the underwriting function is carried out before the contract is printed and mailed. In this system, the terminals operate on-line, underwriting is performed by a human underwriter, and the insurance contract is printed remotely from the client and mailed to him. The on-line terminals are not automatic self-service vending machines; the client must deal with the company through agents.

U.S. Pat. No. 4,975,840 discloses a computerized system for evaluating an insurable risk. A terminal includes a CPU and is coupled to a memory unit which has data bases storing information. Certain elements are assigned weights. The system is used by underwriters to assist them in performing their underwriting functions.

U.S. Pat. No. 4,567,359 discloses a system for automatically dispensing information, goods and services to a customer on a self-service basis including a central data processing center in which information on services offered is stored. Self-service information sales terminals are remotely linked on-line to the central data processing center and are programmed to gather information from prospective customers on goods and services desired, to transmit to customers information on the desired goods or services from the central data processing center, to take orders for goods or services from customers and transmit them for processing to the central data processing center, to accept payment, and to deliver goods or services in the form of documents to the customer when orders are completed. The central data processing center is also remotely linked to institutions, such as insurance companies, serviced by the system to keep the institution updated on completed sales of services offered by that institution. As noted, the terminals in this system are on-line with the central data processing center.

U.S. Pat. No. Re 32,115 discloses a system using self-service terminals for dispensing voice and video information, printed documents, and goods and for accepting orders and payments therefor for travel related services by currency or credit card. The self-service terminals include a processor, printer, dispenser, data sources including a mass storage unit, a card reader, a coin box, and a communication device for communicating with a remote service center. The mass storage unit stores transitory information, such as flight schedules, ticket prices, weather information and other information useful in the planning of a business trip or vacation which is periodically updated via a communication link with the remote control center. The self-service terminal normally operates off-line. However, there is no teaching as to how this terminal could be modified for the underwriting and sale of insurance policies.

SUMMARY OF THE INVENTION

Accordingly, it is the object of the invention to provide an improved system, and method, for vending insurance contracts from interactive self-service vending terminals or stations.

More specifically, the system of the invention involves the use of self-service, interactive vending stations or terminals of this character in which the stations or terminals comprise data processing means, data storage means, input means, message output means, payment means and printer means. The data storage means stores data as to available insurance policies, insurance premiums, insurance qualification criteria, insurance policy and policy application text and customer transaction data as to policies sold. The data processor means is programmed to establish an interactive dialogue between a customer and a station by providing messages for the customer through the message output means and replies from the customer, and to determine from the dialogue whether the customer qualifies for an insurance policy offered by the station. If the customer is qualified, a message offering the policy to the customer is generated. If the customer elects to purchase the policy, a message directs the customer to pay for the policy through the use of the payment means. Payment may, for example, be made by credit card, in which case the customer is instructed to insert his or her credit card in a credit card reader, the station is placed on-line with a credit authorization office which includes means for verifying the credit of the credit card, and, if verified, payment is charged to the credit card, and a payment signal is sent back to the station and stored in the data storage means. When payment has been made by the customer, the printer means is directed to print the policy application with the stored insurance policy application text.

Since it is desirable to provide the insurance company with a copy of the insurance policy contract signed by the customer, the system is adapted to cause such a signed copy of the insurance policy contract to be delivered to the company. In a first embodiment, this is accomplished by directing the printer means to print the policy application document with a customer copy portion and an insurance company copy portion. A message is generated instructing the customer to keep the customer portion and to sign the insurance company portion and mail it to the company or deposit it in a box provided at the terminal. In a second embodiment, the vending stations comprise a signature digitizing module. A message is generated instructing the customer to sign his or her name on a signature pad. The module converts the signature to its digital form, and the digitized signature is stored in the data storage means. A signed copy of the application for the insurance company is stored in digital form in the data storage means. The station is periodically placed on-line with the central office at which time any stored signed policy applications and any stored transaction data are uploaded to the central office system electronically. Alternatively, the stored signed policy and stored bookkeeping data are printed by an internal printer of the terminal or recorded on a floppy disk for periodic collection by a person servicing the terminal.

The insurance qualification criteria includes insurance age eligibility criteria and insurance underwriting criteria. The eligibility criteria establishes a minimum and a maximum age for eligibility for an insurance policy. The dialogue includes a message to the customer to enter his or her age. The data processing means then compares the entered age with the minimum and maximum ages. If the entered age falls below the minimum age or above the maximum age, the data processing means determines that the customer is not eligible for the policies; otherwise, the data processing means determines that the customer is eligible.

The underwriting criteria are established by the answers to a series of health-related questions. The dialogue includes messages to the customer to enter his or her answers to the health-related questions. The data processor means determines from the customer's answers whether the customer meets the underwriting criteria and qualifies for the policies.

In order to minimize line and central office computer time, the stations normally interact with customers while off-line. However, periodically the stations are placed on-line with the central office system through a communication link. At this time, stored data as to customer transactions, including in the case of the second embodiment the signed text of an accepted insurance policy application, are uploaded to the central office system. When the stations are periodically on-line, the central office system may download updates to the stations for updating stored data in the data storage means as to insurance policies available, insurance premiums, insurance qualification criteria and the text of policies and policy applications. As already mentioned, the stations may also be placed on-line during a payment routine for credit verification.

The hard drive of a station stores a lookup table as a continuous data stream comprising a plurality of successive words each having in order a customer's age, a series of coverage options indicating the value of the coverage provided in a policy, and several sets of premiums to be paid by the customer. Each set of premiums corresponds to a policy term or "spread" option determining the length of the term of the policy, and each premium in a set corresponds to a coverage option. A lookup table in this form is more easily updated then tables in other formats. The station's interactive means requests that the customer choose a coverage option, and the station comprises means to cut up the data stream and, in response to the customer's age and the chosen coverage option, to assemble a word including the customer's age, the coverage option chosen, and an assembled group of premiums to be paid by the customer. Each premium of the assembled group is cut from one of the series of premiums and corresponds to the customer's age and the chosen coverage option. The interactive means requests that the customer choose a term option. The station responds to the term option chosen to select a premium from the assembled group of premiums corresponding to the chosen term option. The station stores the customer's age and the chosen coverage and term options in buffer means. By thus cutting up a continuous data stream, the station avoids reading the hard drive over and over, but, rather, reads out the relevant data from the buffer means.

BRIEF DESCRIPTION OF THE DRAWINGS

A clearer understanding of the present invention will be apparent from the following description and the drawings, wherein.

DETAILED DESCRIPTION

Figure 1:
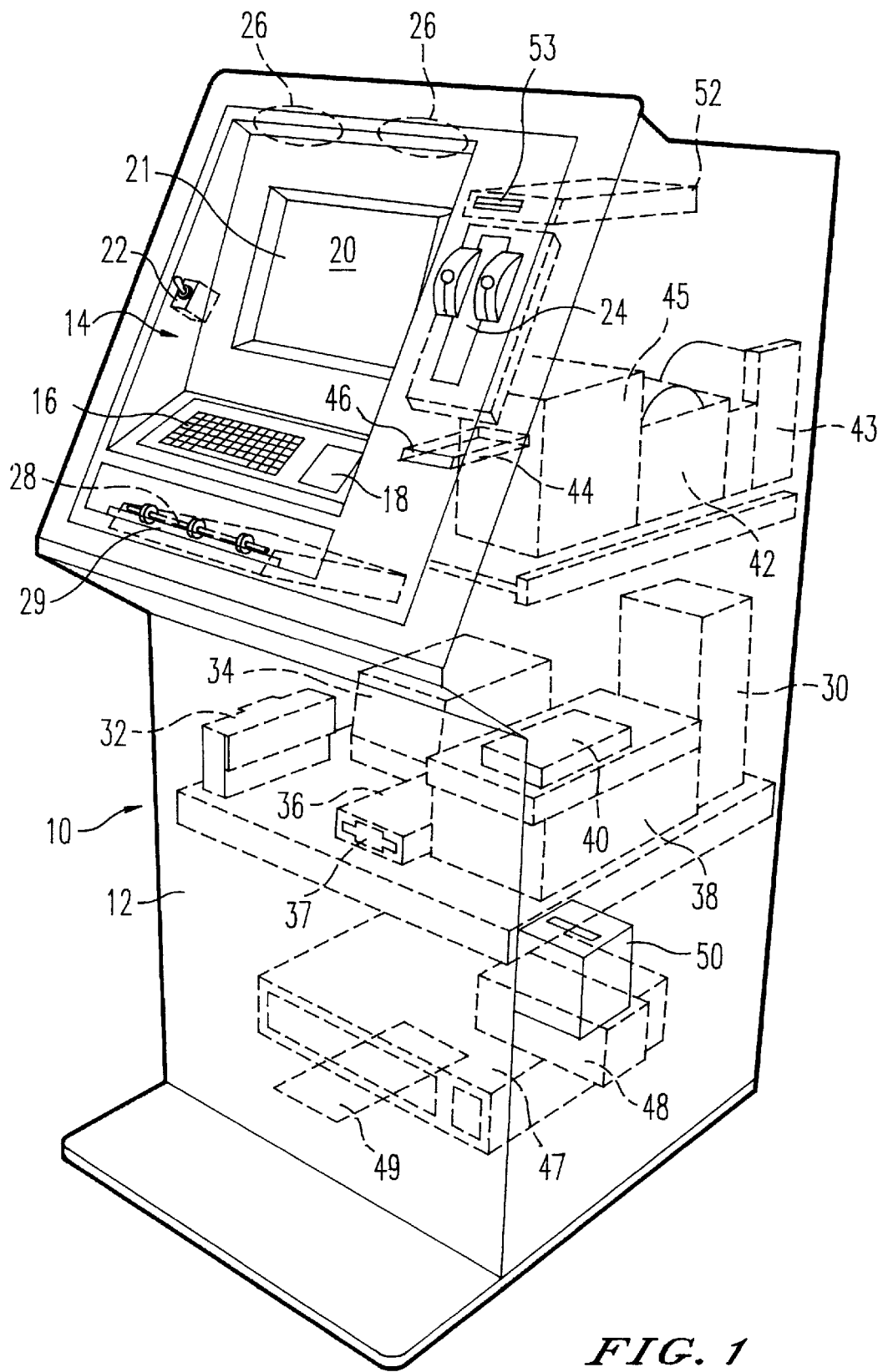
FIG. 1 is a perspective view of a typical configuration of a stand-alone self service terminal of the system of the invention.

A stand-alone interactive self-service delivery terminal or station 10 of the system of the invention is shown in FIG. 1. The terminal comprises a housing 12 having a recessed portion 14 providing access for a customer to an entry keyboard 16, a digital signing pad 18, and a video display 20 incorporating an integrated flat infrared touch screen 21. A power switch 22 is provided to the left of display 20 and a dip credit card reader 24 is positioned to the right of display 20. In order to make audible communication with a customer possible, a pair of loudspeakers 26 are installed above screen 20. An 80-column printer 28 is positioned below keyboard 16 for providing copies of insurance applications or insurance policy contracts to customers through a dispensing opening 29.

Figure 3:
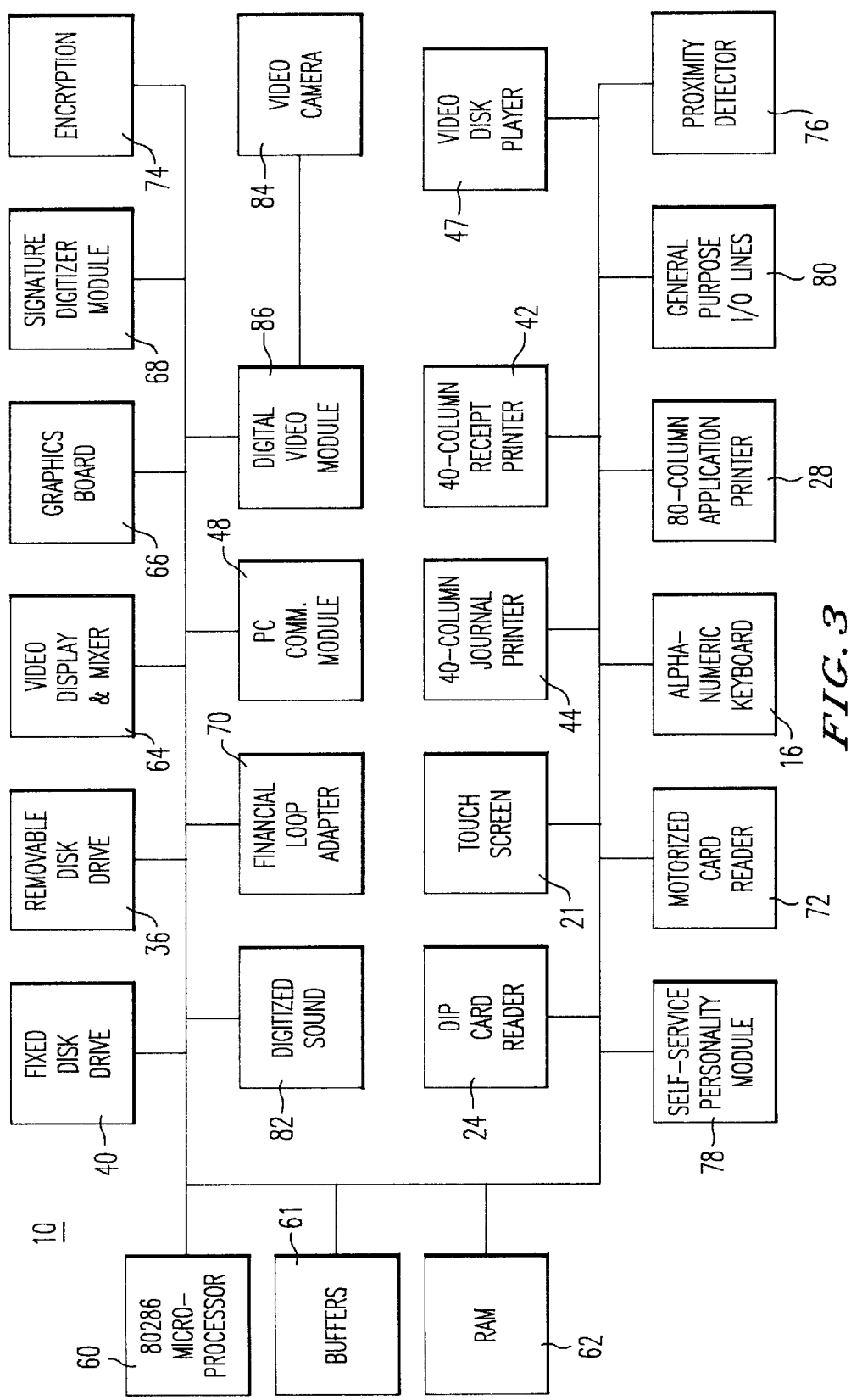
FIG. 3 is a block diagram of a stand-alone self service terminal of the system.

A number of components are shown in dash line within the housing. These components include a power supply 30, an AC power distributor 32, and a power transformer 34. A removable floppy disk drive 36 is accessed through an opening 37. The circuit components of the terminal, including a microprocessor, buffers and a RAM, as shown in FIG. 3, are supported on a "TPC platform" 38; a hard disk drive 40 is also mounted on platform 38. A pair of 40-column printers 42 and 43 are provided. Printer 42 is a receipt printer which prints receipts for the customer. These are transferred along a path 44 by a motor drive 45 through a dispensing slot 46 just below card reader 24. Printer 43 is an internal journal printer for printing transaction data and, in one embodiment, printing a copy of the application with an analog signature derived from digital signing pad 18. Papers printed by printer 43 are delivered to a tray or bin (not shown) within housing 12 for later pickup. As will be explained below, service personnel periodically gain access to the tray through a door or panel (not shown) and remove the printed transaction data and, if present, copies of signed applications, representing sold insurance policies from the tray. A video disk player 47 which may be a source for images on display 20, a PC communications module 48 incorporating a modem for communicating with a central office computer, a miscellaneous interface board 49, and an audio amplifier 52 for driving loudspeakers 26 with accessible controls 53 are also seen within housing 12. In one embodiment, the customer is directed to deposit a signed copy of the application in a box 50 through a slot. Box 50 is bolted to the right side of housing 12.

Figure 2:
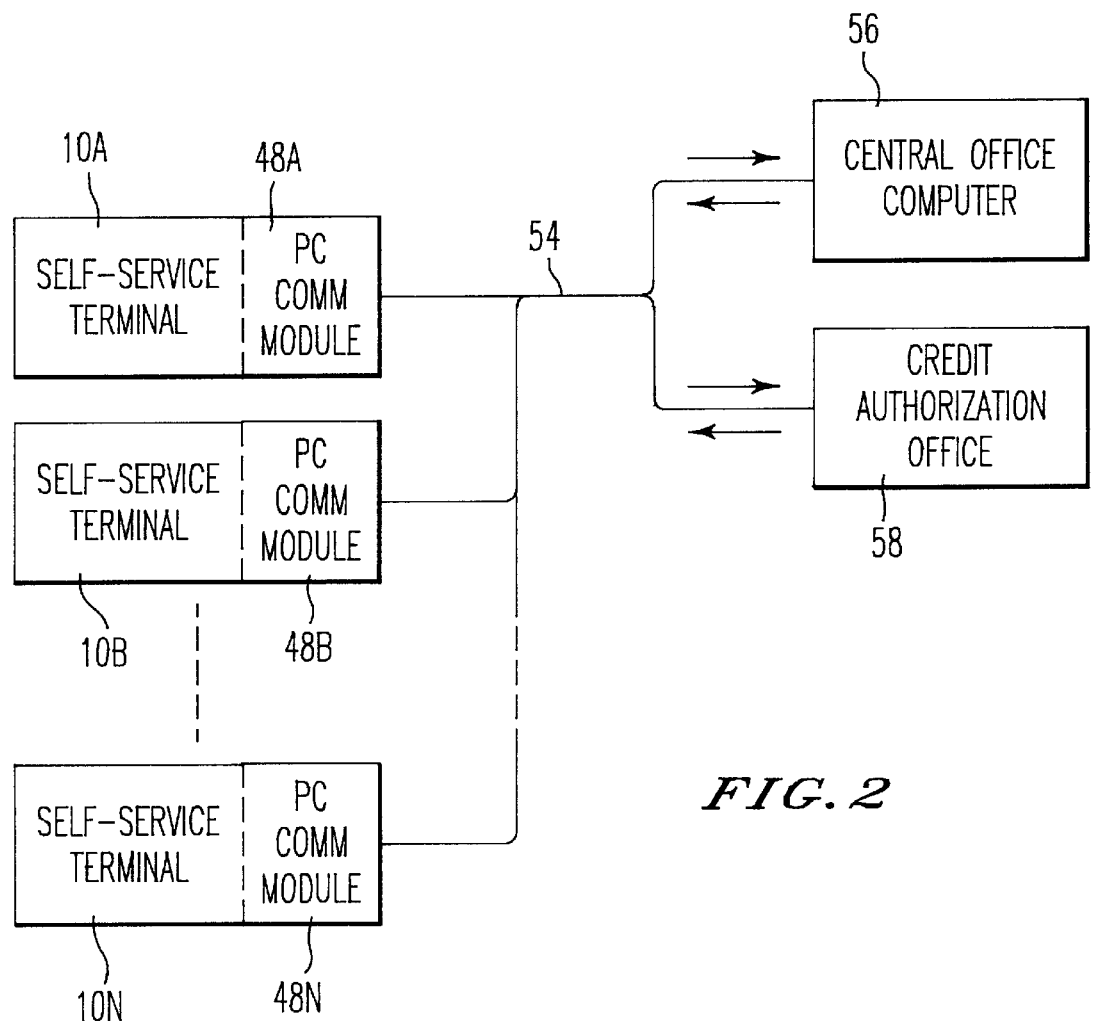
FIG. 2 is a block diagram of the system.

An overall system of the invention is shown in FIG. 2. A number of remote stand-alone terminals 10A, 10B . . . 10N communicate through respective PC communications modules 48A, 48B . . . 48N, each incorporating a modem, over a telephone line 54 with a central office computer 56 and, in the case of a credit authorization routine, with a credit authorization office 58.

As shown in FIG. 3, a stand-alone self service terminal 10 of the invention includes an 80286 microprocessor 60, which, in addition to an 80286 microprocessor chip includes all necessary ancillary computer circuitry to enable functioning as a computer, buffers 61, one or more RAMs 62, the fixed or hard disk drive 40, and the removable floppy disk drive 36. A video display screen and mixer 64 which incorporates video display screen 20 is associated with graphics board 66 and video disk player 47 for generating images on display screen 20 through which the terminal communicates with the customer. As mentioned above, 80-column application printer 28 delivers a printed copy of the insurance application to the customer. 40-column receipt printer 42 delivers a receipt for payment through slot 46. 40-column journal printer 43 prints transaction data and, in one embodiment, a signed copy of the application. These are collected periodically by a person servicing the terminal. The touch screen 21 and keyboard 16 provide the customer with means to communicate with the system.

An option, available in one embodiment of the invention, and added to the prior art NCR terminal, is signature digitizer module 68. This module is of a type known in the art and comprises signing pad 18, on which the customer signs his or her name, when so instructed by the terminal. The signing pad is associated with means for converting the analog signature to digital form. The digitized signature is stored in a buffer within the module.

PC communications module 48, which includes a modem, is used, as described above, to communicate with either central office computer 56 or credit authorization office 58. When the application is approved, the terminal directs the customer to insert his or her credit card in dip card reader 24. By means of software provided by financial loop adaptor 70, the terminal then communicates with credit authorization office 58. Alternatively, a motorized card reader 72 may be substituted for, or added as an alternative to, dip card reader 24. An encryption module 74 may be employed to encode the signals sent out on line 54.

An important option is a proximity detector 76 located adjacent screen 20 to turn the terminal on when a customer approaches the terminal. Alternatively, an "attract" message on the screen directs the customer to touch touch screen 21. When the screen is touched, the system is turned on.

A "self service personality" module 78 provides software to establish the look and feel of the interactive dialogue with the customer. The system also includes general purpose I/O lines 80.

Additional options include a digitized sound module 82 for communicating with the customer audibly through loudspeakers 26. A video camera 84 may be used in cooperation with digital video module 86 to incorporate the customer's image in the stored information in the terminal which is periodically transmitted to central office computer 56.

For the most part, stand-alone terminal 10 uses the hardware of the prior art NCR terminal, identified as model NCR 5682. An important addition to this prior art hardware, for one embodiment of the terminal of the invention, is signature digitizer module 68 and its signature pad 18. The principal changes imparted by the present invention reside in the software adapted to govern the operation of the terminal and system.

The features of the software and the operation of a stand-alone terminal 10 of the invention are shown and illustrated in the flow chart of FIGS. 4A–4J. Before discussing the flow-chart, it is to be noted that a series of messages are displayed on display screen 20. As is well know in the art, such messages are first assembled in an image RAM or buffer under the direction of the software from fixed disk drive 40, removable disk drive 36 and/or video disk player 46 and are then transferred through video mixer 64 to the video display 20. The software establishes an interactive dialogue between the terminal and the customer by displaying screens on display 20 directing questions or instructions to the customer. The customer, in turn, responds by touching an appropriate spot on touch screen 21, inputting information through keyboard 16 or signing pad 18, or otherwise following the directions displayed on the screen. This aspect of the software and the hardware means used in implementing it and the customers responses are referred to herein as "interactive means". However, "the terminal" or "the station" will be understood as referring to the source of functions originating in the software for generating a message displayed on screen 20 or any other software functions.

Figure 4A:
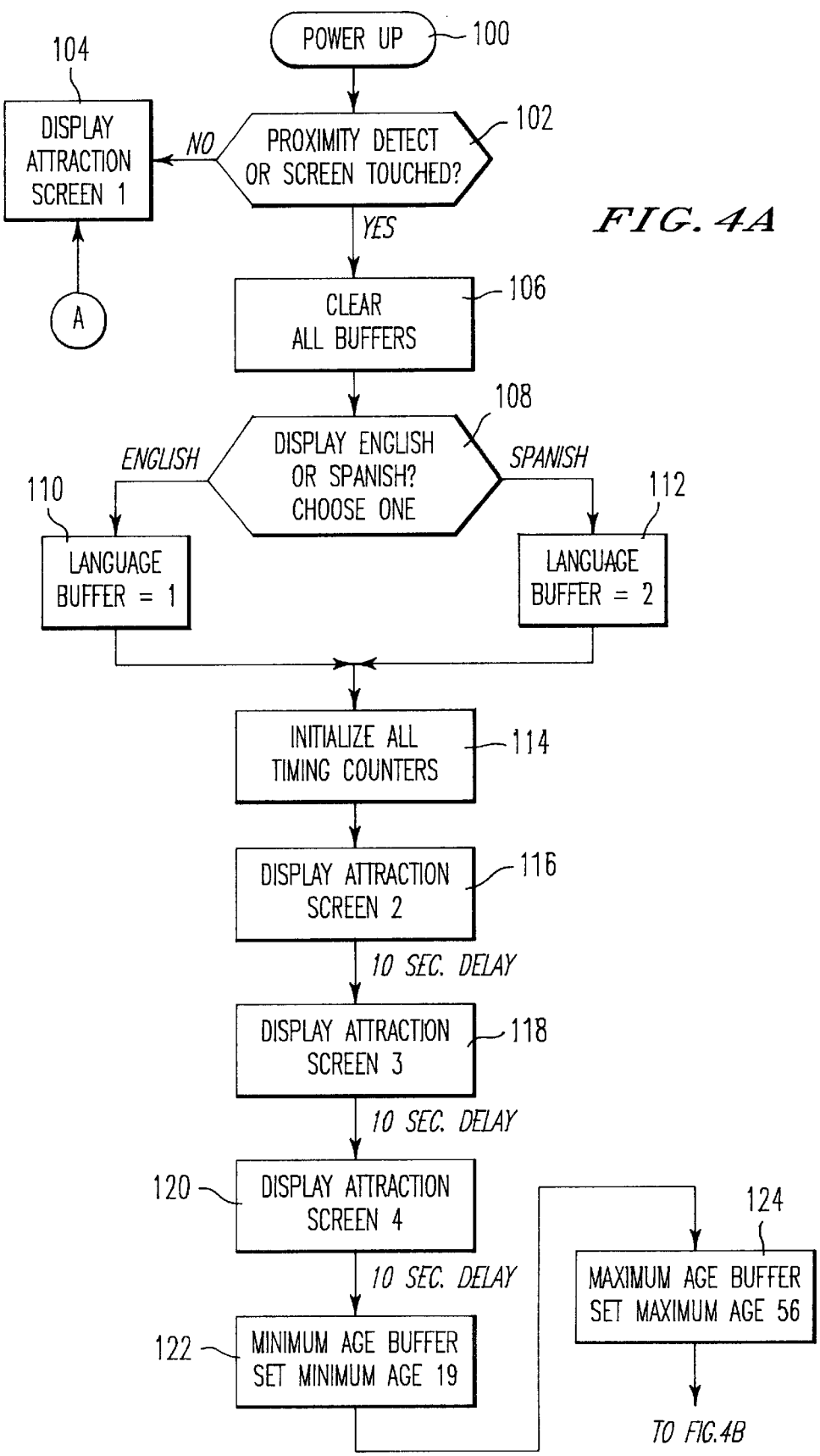
FIGS. 4A–4J comprise a flow chart showing the operation of the stand-alone terminal.

Referring to FIG. 4A, upon connecting the terminal to a supply of electrical power at 100 ("power up"), a determination is made at 102 as to whether a customer is present. In one embodiment, proximity detector 76 senses the customer as he or she approaches terminal 10. In a second embodiment, display screen 20 displays a sales message ("Attraction Screen 1") instructing the customer to touch touch screen 21, if he or she is interested in an insurance policy being vended by the system. If a customer's presence is not sensed by proximity detector 76 or if, for the second embodiment, the customer does not touch touch screen 21, a "NO" output causes at 104 display of "Attraction Screen 1" on screen 20. If, however, a customer has been sensed by proximity detector 76, or the customer has touched touch screen 21, a "YES" output causes the terminal to clear all buffers at 106.

The terminal at 108 then generates a message displayed on the screen asking the potential customer if he or she prefers English or Spanish and invites the potential customer to touch the screen at an appropriate indicated spot to select either English or Spanish as the language used by the terminal and the customer in their interactive dialogue. If English is selected as the language of the dialogue, an "ENGLISH" output directs an assigned language buffer at 110 to be set at "1". If Spanish is selected, a "SPANISH" output directs the language buffer at 112 to be set at "2".

As indicated at 114, the terminal then initializes all timing counters in the terminal and directs the display, as shown at 116, of a second attraction screen "Attraction Screen 2" containing an additional sales message. After the timing counters count a predetermined period of time, such as ten seconds, the terminal directs the display of a third attraction screen "Attraction Screen 3", as shown at 118, providing another sales message. After the timing counters count a second predetermined period of time, such as ten seconds, the terminal causes the display of a fourth attraction screen "Attraction Screen 4" as shown at 120. The attraction screens are a series of related sales and/or instructional messages for the customer. After "Attraction Screen 4" is displayed, the timing counters again count the predetermined period, such as ten seconds, and, at the completion of this time period, an assigned minimum age buffer is set at 122 for the minimum age nineteen. Next, a maximum age buffer is set at 124 for the maximum age fifty-six.

Figure 4B:
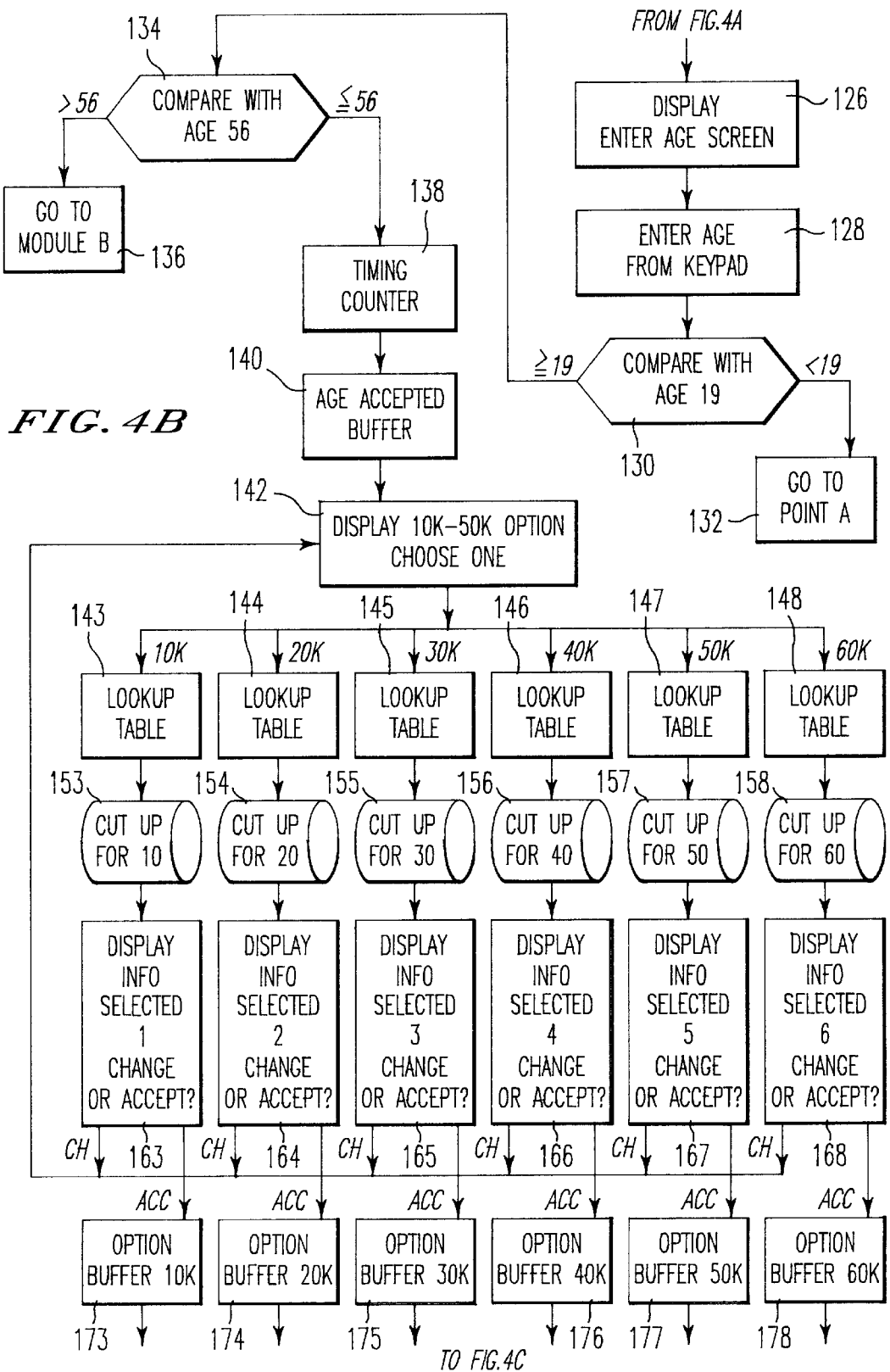

As indicated at 126 in FIG. 4B, the terminal then displays an "Enter Age" screen, instructing the customer to enter his or her age through keypad 16. At 128, the customer then enters his or her age by keying in the age through keypad 16. As indicated at 130, the terminal then compares the entered age with minimum age nineteen. If the comparison indicates that the entered age is less than nineteen, as indicated at 132 the system returns to point A of the flow chart, again displaying "Attraction Screen 1" at 104. If the entered age is equal to or greater than 19, as indicated at 134 the terminal then compares the entered age with maximum age fifty-six. If the comparison indicates that the entered age is greater than maximum age fifty-six, as indicated at 136, the terminal is then directed to module B which will be described below. If, however, the comparison indicates that the entered age is equal to or less than maximum age fifty-six, as indicated at 138 an assigned timing counter establishes a delay. Then, as shown at 140, an assigned age accepted buffer is set to indicate acceptance of the customer's age and to store this age. Having accepted the age of the customer—that is, having determined that the age of the customer makes him or her eligible for consideration as a purchaser of a policy—, it becomes necessary to determine how much insurance coverage the customer wishes and how many years the customer wishes the policy to run. After the customer chooses a coverage option and a length of term, or "spread", option, it is necessary to determine, with due regard for the customer's age, the premium the customer will be required to pay for the policy. Such information is usually determined by consulting a table, and in a computer environment such a table is stored in memory as a lookup table.

Figure 7:
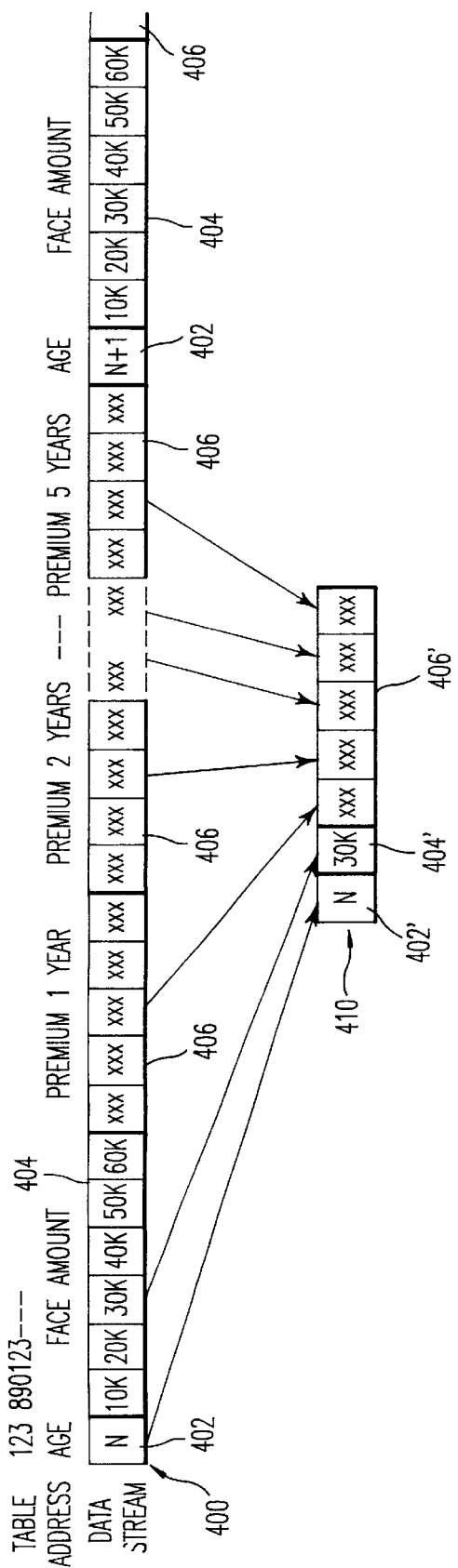
FIG. 7 is a diagram of a lookup table in the form of a continuous data stream stored in the hard disk drive of the terminal and illustrates how the data stream is cut up.

According to the present invention, the lookup table is provided as a continuous data stream stored in the hard disk drive 40. As shown in FIG. 7, the data stream 400 consists of successive words each having an age header or leader 402 followed by a set of data 404 for face amount indicating the value of the coverage provided by the policy. This is followed by a series of sets 406 for the premium to be paid by the customer. There are successive sets 406 for several "spread" or term options: for one year, two years, three years, four years and five years. Each set of premiums contains six successive premiums as indicated, corresponding respectively with six coverage options. The first word is followed by a second word which begins with a header 402 for the next age. If the header for the first word is designated N, the header for the next word is designated N+1. This header is followed by the set 404 of face amounts or coverage options for $10,000, $20,000, $30,000, $40,000, $50,000 and $60,000 and this, in turn, is followed by the successive sets of premiums. The data stream repeats this pattern for each successive age. For the example shown in the flow chart, the first word of the data stream begins with the header "19" and the last word with the header "56." As seen in FIG. 7, a table address is shown alongside the data stream. In order to find a particular segment of the data stream, such as the premium corresponding to age 20 for a coverage option of $20,000, for a two year term, the second word (header for age 20), second set of premiums (two year term), and the second premium of the set ($20,000 coverage option) is accessed by table address. By formatting the lookup table in this way, revision and updating of the table is greatly facilitated.

Returning again to the flow chart in FIG. 4B, the terminal displays a message at 142 which asks the customer to select one of six coverage options for coverage of $10,000, $20, 000, $30,000, $40,000, $50,000 or $60,000. The customer is directed to choose one of these coverage options by touching an appropriate spot on the touch screen. After the customer selects one of these coverage options, the system initiates a "cut up" routine. The continuous data stream stored in the hard disk drive is addressed by the terminal to extract those parts of the data stream relevant to the choice made. This is illustrated in FIG. 7 in which the data stream 400 is cut into its several elements, and particular elements are assembled to form an assembled word or sub-table 410. In the case of a customer of age N who has selected a coverage option of $30,000, the sub-table 410 has a header 402' of N, a face amount 404' of $30,000 from the word for age N and an assembled set 406' of premiums. This assembled set 406' contains a group of premium values taken from the word for age N, the premium values corresponding to the chosen coverage option from each of the sets for one year, two year, three year, four year and five year terms. In the example given, this will be the third premium value from each of the five premium sets 406.

Returning to FIG. 4B, the sub-lookup table created after cutting up the data stream is assembled for the $10,000 coverage option at 143. Likewise, if the $20,000, $30,000, $40,000, $50,000 and $60,000 coverage options are selected, similar sub-lookup tables will be assembled, respectively, at 144, 145, 146, 147 or 148, each assembled from the word for the customer's age and for the coverage option selected. The respective sub-lookup tables 143, 144, 145, 146, 147 and 148 will thus include, for the customer's age and the coverage amount selected, an assembled set of the premiums for each possible policy term option. Sub-lookup tables 143, 144, 145, 146, 147 and 148, which are referred to as the "cut up" for the respective coverage options, are then stored in respective cut-up buffers at 153, 154, 155, 156, 157 and 158. The customer's age is also carried forward from the age accepted buffer and stored in the cut-up buffer 153, 154, 155, 156, 157 or 158 for the selected coverage option. For the selected coverage, the "cut up" stored in the corresponding buffer at 153, 154, 155, 156, 157 or 158 is displayed on screens 163, 164, 165, 166, 167 or 168, respectively. The screen will show the age of the customer and the coverage selected and the premiums for each policy term option. The customer is asked on the screen whether he or she accepts the chosen option or wishes to change it. If he or she wishes to change the option, the screen is touched at an appropriate point to generate the "change" signal "CH". This causes a return to the display at 142 for choosing a coverage option. The customer may then choose a different option. If the choice is accepted, the customer is asked to touch the screen at another point to generate the "accept" signal "ACC". This causes the chosen coverage option, and the customer's age, to be stored in a respective option buffer 173, 174, 175, 176, 177 or 178.

Figure 4C:
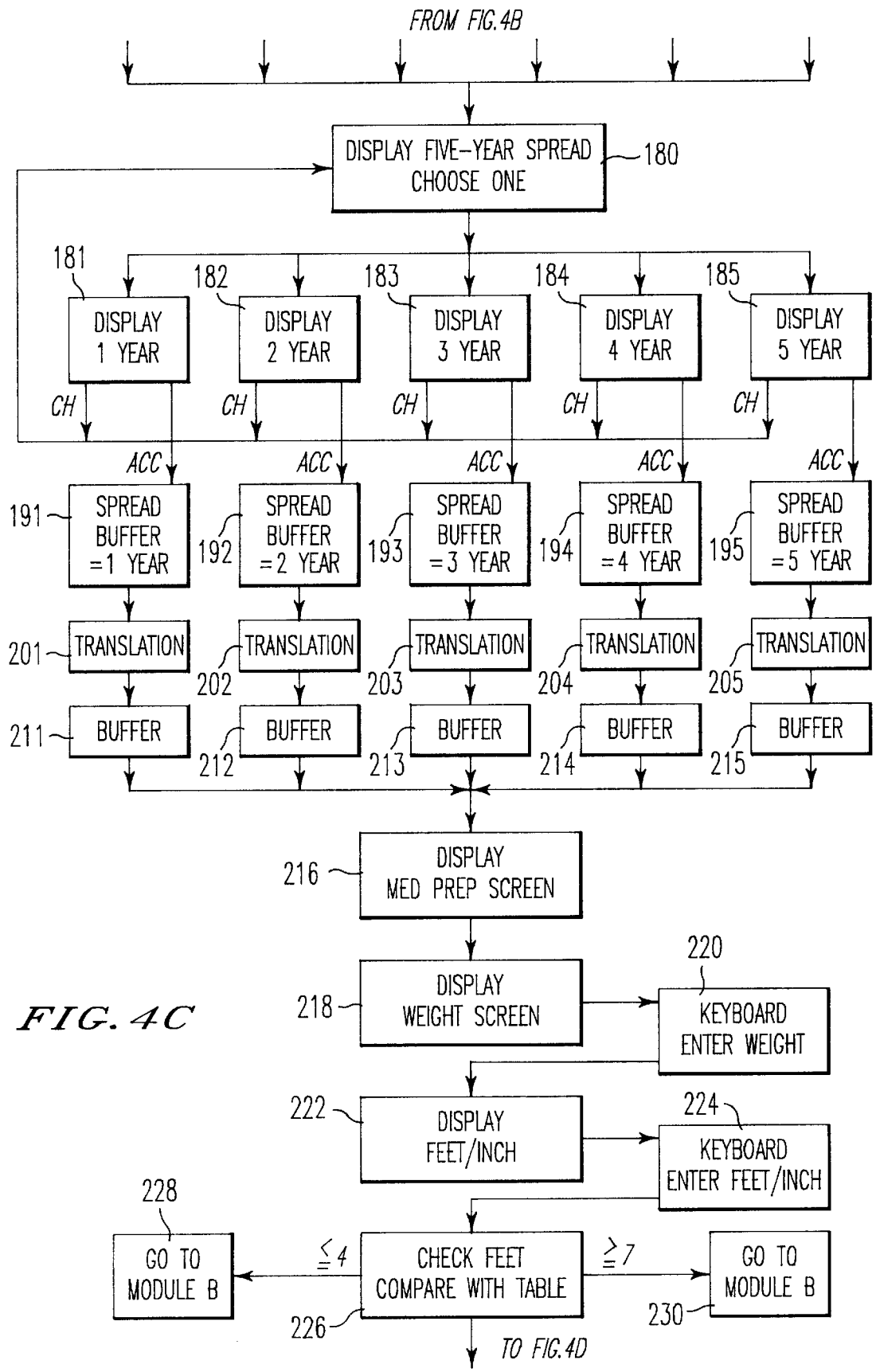

Turning to FIG. 4C, the terminal at 180 then displays a "five-year spread" question, asking the customer to select a policy term of one, two, three, four or five years. The customer chooses one of these spreads by touching an appropriate spot on the screen. The terminal then reads the cut up tabular data and selects the premium which corresponds to the spread selected. The premium is then displayed at 181, 182, 183, 184 or 185, depending on which spread is selected. The display indicates the customer's age, the coverage option selected, the policy term or spread selected, and the premium which the customer must pay for the policy. The display asks the customer if he or she wishes to change the choice. If so, the screen is touched to signify this and the "change" signal "CH" is generated. The terminal then returns to the "five year spread" question screen at 180, permitting the customer to make another choice. If the customer accepts the displayed policy term, he or she signals this by touching the screen, generating the "accept" signal "ACC". The choice and the selected premium are then stored in a respective spread buffer 191, 192, 193, 194 or 195. Because the stored data is in a hex format, and data in the ASCI format is now required, a respective translation is effected at 201, 202, 203, 204 or 205. The translated data is then stored in an assigned respective buffer 211, 212, 213, 214 or 215.

Figure 4D:
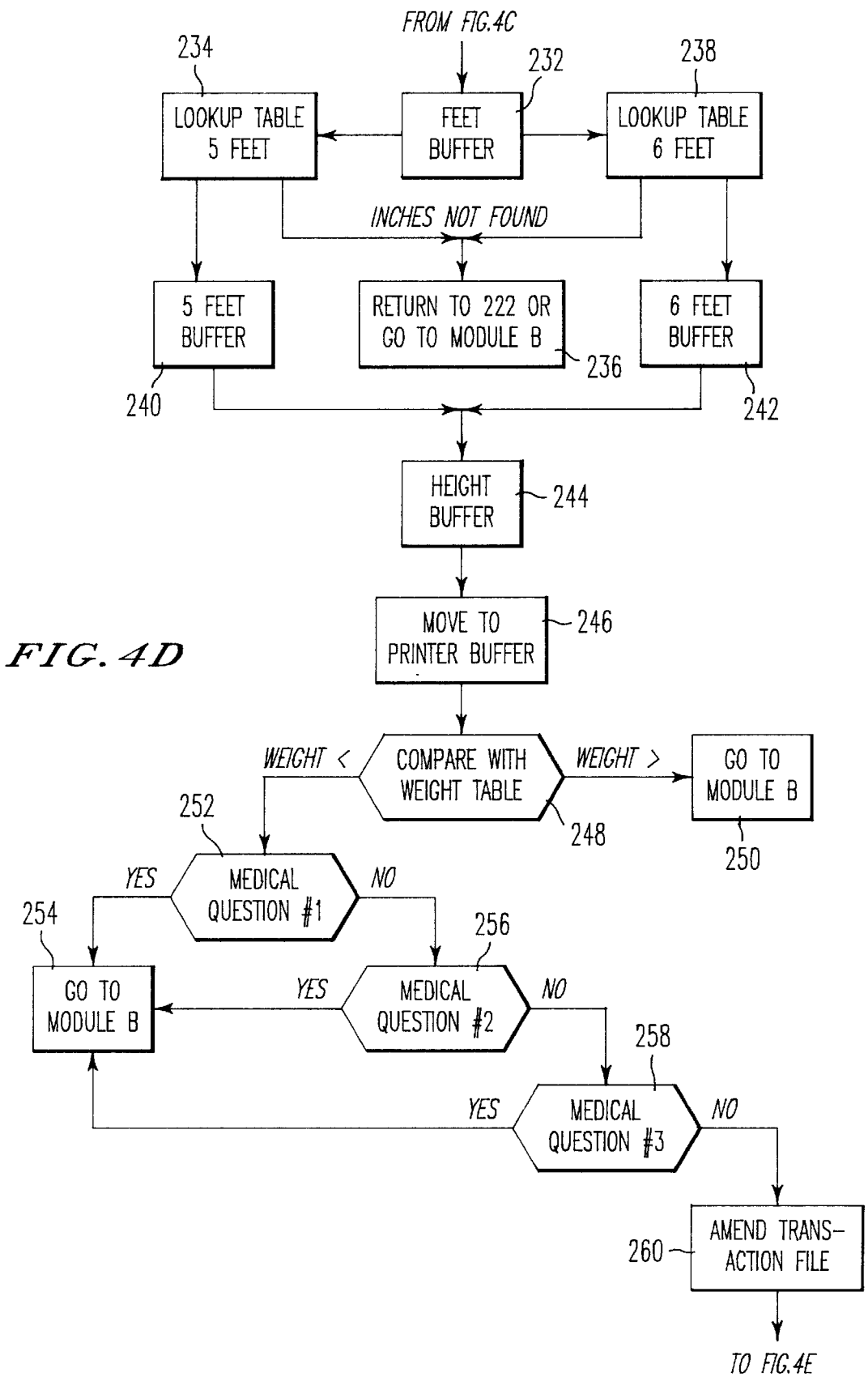

The terminal then displays a "medical prep" screen at 216 which informs the customer that a series of medically relevant questions will be asked. The first of these is asked on a "display weight" screen at 218. The screen asks the customer to enter his or her weight through keyboard 16. The customer then keys in his or her weight through the keyboard at 220. The terminal next displays a "display feet/inch" screen at 222. The customer is asked to key in his or her height in feet and inches through the keyboard. The customer then keys in his or her height in feet and inches through the keyboard at 224. The terminal then compares the entered feet at 226 with a table. If the entered feet is smaller than or equal to four feet, the program then goes to module B at 228. If the entered feet is equal to or greater than seven feet, the program again goes to module B at 230. Turning to FIG. 4D, if the feet data entered through the keyboard falls between four feet and seven feet the entered feet data is stored in a feet buffer at 232. If the feet selected and stored in the feet buffer is five feet, the system at 234 checks a lookup table for five feet, to determine whether the inches entered at 224 is found on the table—that is, whether the inches entered fall within the range from zero to eleven. If the inches have not been entered or are greater than eleven, an "inches not found" output leads the terminal at 236 to return to the display of the "display feet/inch" screen at 222. If the inches again have not been entered or are greater than eleven, the terminal goes to module B at 236. Likewise, a lookup table for six feet at 238 is checked to determine whether the inches entry falls within the range from zero to eleven. Again, if no entry for inches has been made, or if the inches entered do not fall within this range, the terminal at 236 returns to the "display feet/inch" screen at 222. If, again, the inches have not been entered or are greater than eleven, the terminal at 236 returns to module B.

If, however, the lookup table for five feet indicates that the entered inches fall within the zero to eleven range, the entered feet and inches are stored in a five feet buffer at 240. In the same way, if the lookup table for six feet indicates that the inches entry falls within the zero to eleven range, the feet and inches are stored in six feet buffer at 242. The feet and inches stored in the five feet buffer or the six feet buffer are then stored in height buffer at 244. Since the customer's height will be printed on the application, the height data is then moved to a printer buffer at 246.

The terminal at 248 now compares the height stored in the height buffer and the weight entered at 220 with a weight-height table which lists a maximum acceptable weight for each height. If the customer's weight is greater than the maximum weight listed for the customer's height, the terminal goes to module B at 250. If the customer's weight is below the maximum weight for the customer's height, the terminal displays "medical question #1" at 252, and the customer's weight is stored in the printer buffer to be printed on the application. If the customer's answer is "yes", indicating the customer has or has had the medical condition asked about, the terminal goes to module B at 254. If, on the other hand, the customer's answer is "no", indicating that the customer does not have or has not had the medical condition asked about, the terminal displays "medical question #2" at 256. Again, if the customer answers "yes", the terminal goes to module B at 254. If the costumer answers "no", the terminal displays "medical question #3" at 258. As before, a "yes" answer leads the terminal to go to module B at 254. A "no" answer causes the terminal to amend a transaction file at 260 to indicate that the customer has passed the medical test and has satisfied the underwriting criteria. If the customer fails the medical test, the transaction file is also amended to indicate which questions were not correctly answered. The customer's height and weight is also recorded in the transaction file. This file can be consulted when a salesman for the company wishes to follow up with a customer who did not qualify for a policy from the terminal.

Figure 4E:
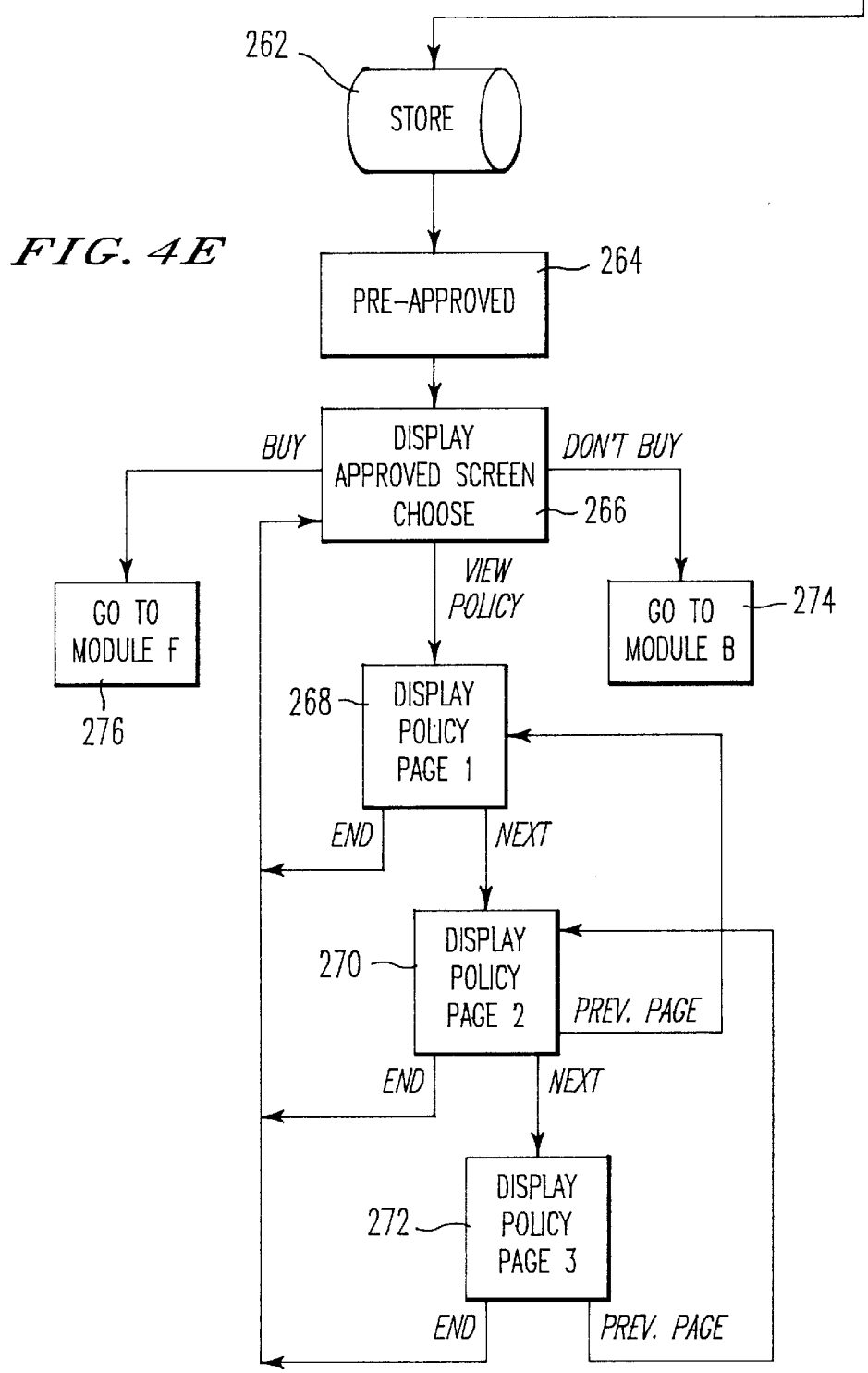

As indicated in FIG. 4E, the terminal stores the information that the customer has passed the medical test in an assigned buffer at 262; and the terminal determines that the customer is pre-approved for insurance at 264. This leads the terminal to display an "approved" screen at 266 which notifies the customer that his or her application for insurance has been preliminarily approved. The screen asks the customer whether he or she wishes to view the policy, buy the policy or not buy the policy. If the customer wishes to review the policy, he or she indicates "view policy." This causes the terminal at 268 to display page 1 of the policy. If the customer has seen enough of the policy, he or she indicates "end", and the terminal returns to the "approved" screen display at 266. If the customer wishes to see the next page, he or she indicates "next". The terminal then displays page 2 of the policy at 270. Again, if the customer has seen enough of the policy, he or she indicates "end"; and the terminal returns to the "approved" screen at 266. If the customer wishes to review the previous page, "prev. page" is chosen; and the terminal returns to the display of page 1 at 268. If the customer wishes to see the next page, he or she chooses "next". The terminal then displays page 3 of the policy at 272. The customer is given a choice of viewing the previous page by indicating "prev. page". If "prev. page" is indicated, the terminal returns to the display of policy page 2 at 270. The customer may also indicate "end" which causes the terminal to return to the "approved" screen at 266. If the customer indicates "don't buy", the system goes to module B at 274. If the customer indicates "buy", the system goes to module F at 276.

Figure 4F:
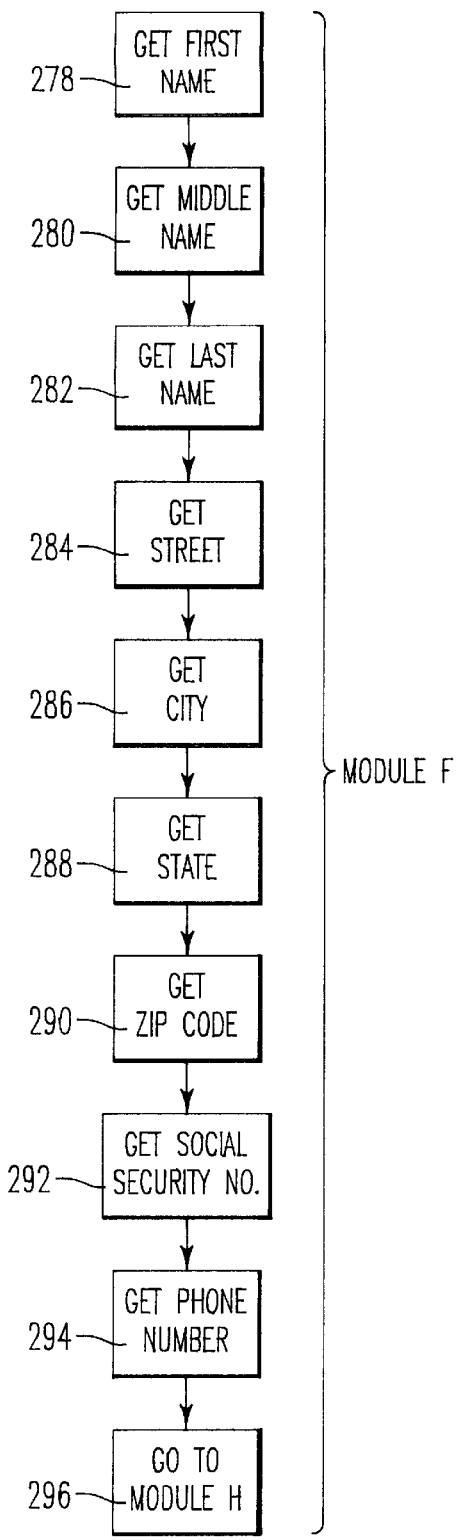

Module F is shown in FIG. 4F. A screen at 278 asks the customer to key in his or her first name. Then a screen at 280 asks the customer to key in his or her middle name and to key in his or her last name at 282. The customer is then asked at 284 to key in his or her street address, at 286 to key in the name of his or her city, at 288 to key in the name of his or her state, and at 290 to key in his or her zip code. The customer is then asked for his or her social security number at 292. The customer's phone number is asked for at 294. After the phone number is keyed in, the terminal goes to module H at 296.

Figure 4G:
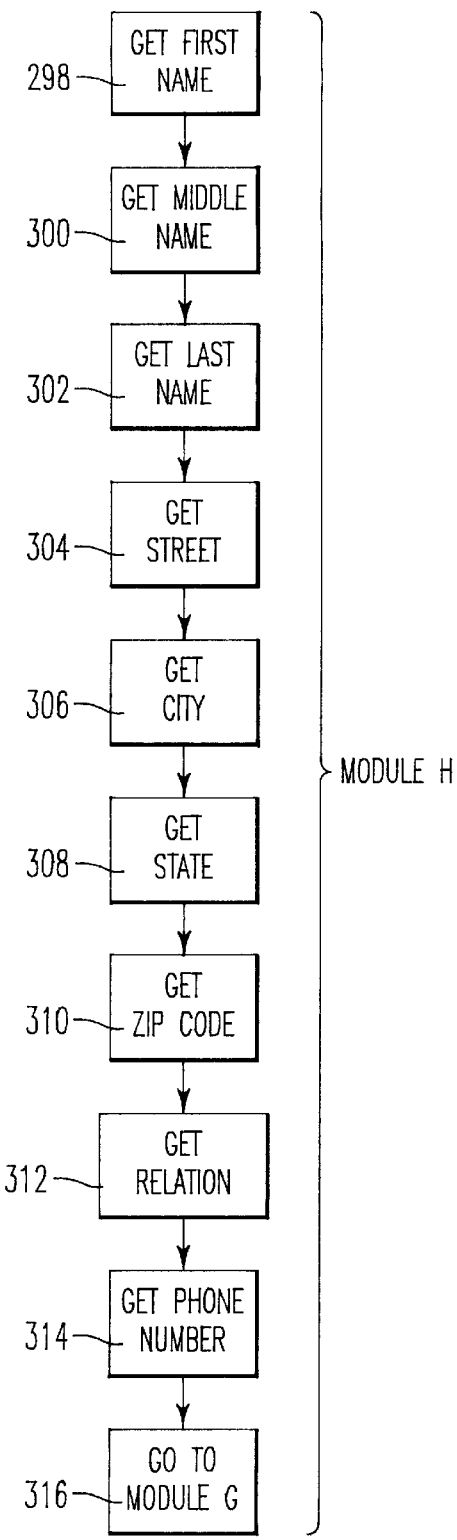

Module H is shown in FIG. 4G. Screens at 298, 300, and 302 ask the customer to enter the first name, middle name and last name of his or her beneficiary and, at 304, 306, 308 and 310, the beneficiary's street address, city, state and zip code. The beneficiary's relation to the customer is requested by a screen at 312, and the beneficiary's phone number is requested at 314. The terminal then goes to Module G at 316. As the customer keys in the personal data requested in modules F and H, the data is stored in assigned personal data buffers.

Figure 4H:
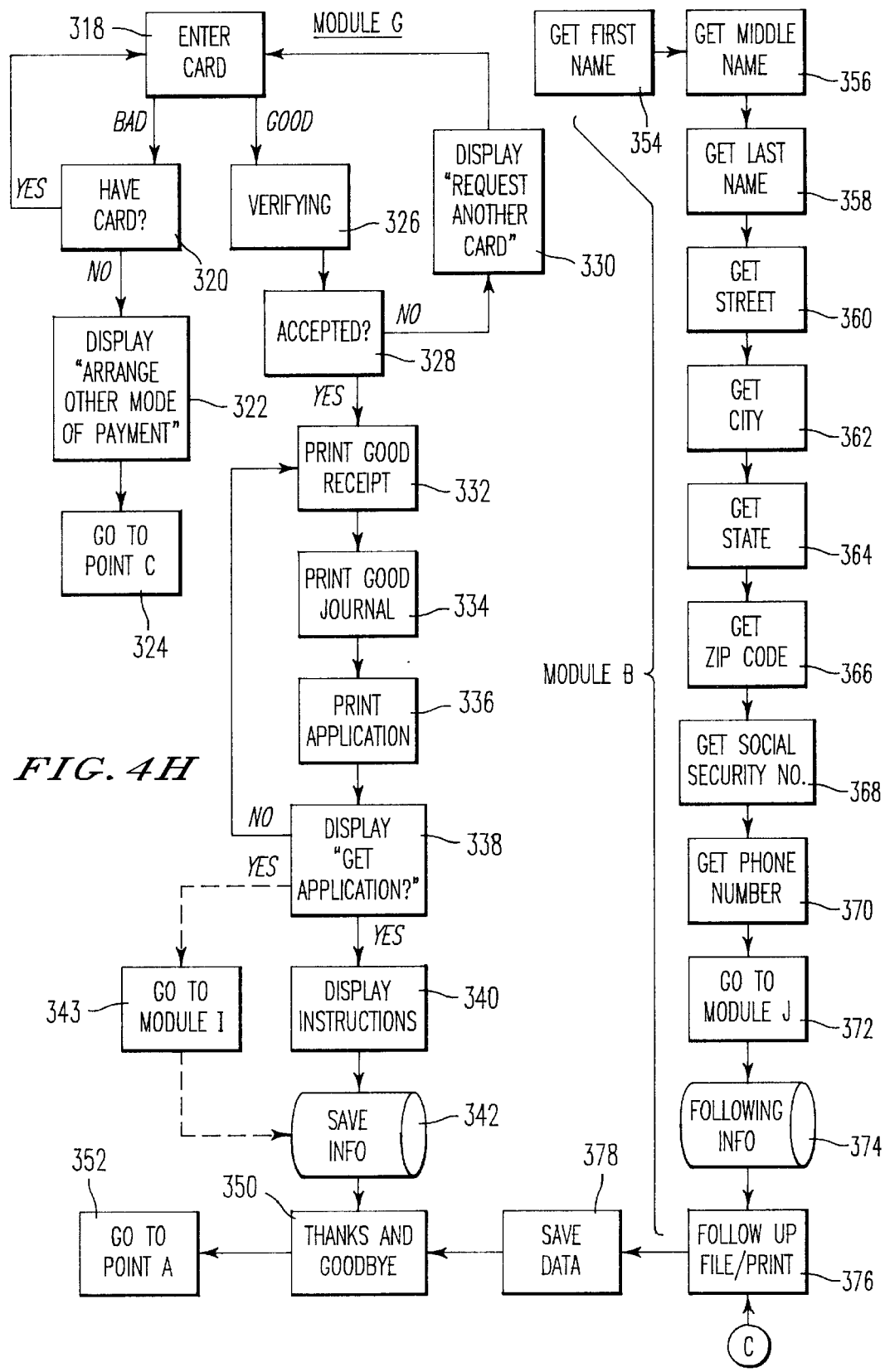

Module G, which is shown in FIG. 4H, is concerned at the outset with credit verification. A screen at 318 instructs the customer to insert his or her credit card in credit card reader 24 and may also direct the customer to enter his or her PIN. The customer inserts the card. If the card is defective, a "bad card" signal leads the terminal at 320 to request that a credit card be entered again at 318. If the customer has no effective card, he or she touches the screen to signify that there is no effective card. The terminal then at 322 displays a screen instructing the customer to "arrange another mode of payment" by contacting an agent of the company selling the insurance policy. The terminal at 324 then goes to point C.

If the card is inserted in response to the screen at 318 and is an effective card, a "good" signal initiates a verifying routine at 326. As shown in FIG. 2, the verifying routine, which is under the control of financial loop adapter 70, involves transmitting the credit card number, expiration date, and the amount of the transaction through the PC communications module 48, which includes a modem, on a telephone line 54 to the credit authorization office 58. This office operates in a manner well known in the art to determine whether the card is acceptable and, if acceptable, to charge payment to the card. Office 58 then transmits a signal back to the terminal that the card is accepted or that it is not accepted. As indicated at 328, if the signal received from the credit office is that the card is not accepted a "no" signal leads to generation at 330 of a screen instructing the customer to use another card. The customer then enters a new card again at 318.

If the signal returned by credit office 58 is that the card is "accepted", a "yes" signal at 328 causes the receipt printer 42 at 332 to print a receipt for the amount of the transaction, the credit approval number, and the credit card number and expiration date. The receipt is then fed along path 44 to receipt dispensing opening 46. As indicated at 334, the terminal then causes data about the transaction to be fed to a journal printer buffer, and causes journal printer 43 to print this data about the transaction in the "journal". This data, which includes the information printed on the receipt, is also stored in the transaction file. As indicated above, the "journal" is a printout of internal bookkeeping journal data which is picked up periodically by service personnel.

The terminal next at 336 causes 80-column application printer 28 to print a copy of the insurance application. The text to be printed is assembled in the print buffer and includes standard text forming the layout of the application as stored on hard disk drive 40. Data as to the customer's height and weight is already stored in the print buffer at 246. The customer's personal data is obtained from personal data buffers storing the data obtained in module F (FIG. 4F), and the beneficiary's personal data is obtained from personal data buffers storing the data obtained in module H (FIG. 4G). The customer's age, the coverage and spread options chosen and the premium paid are obtained from buffers 211–215.

In a first embodiment of the invention, the application is printed in two duplicate parts, one being a customer's copy and the other being a company's copy for the company selling the insurance. The application copies are dispensed through slot 29. In a second embodiment, the application is printed in one part. For the first embodiment, a screen at 338 asks the customer whether he or she has the printed application ("get application"). If the customer answers "no", the terminal returns to "print good receipt" at 332 and reprints the receipt at 332, the journal at 334 and the application at 338. If the customer answer "yes", a screen at 340 displays instructions directing the customer to separate the two parts of the application, to keep the customer's copy, to sign the company's copy, and to either place the signed company's copy in box 50 for later pickup or to mail the signed company's copy to the company selling the insurance. The information contained in the application is then stored in a buffer at 342. As will be explained hereinbelow, this information will be transmitted to the central office.

For the second embodiment, a "yes" answer to the "get application?" question at 338 causes the terminal to go to module I at 343. Turning to FIG. 4I, as shown in module I the terminal displays a screen at 344 which includes the instruction "sign name on digipad." The customer at 346 then signs his or her name on digipad 18 which is part of signature digitizer module 68. In this module, as is well know in the art, the signature signed on digipad 18 is converted to digital form at 347. The digitized signature is then stored in a buffer at 348. As seen at 349, the digitized signature is then added to the information saved at 342. When the saved information is transmitted to the central office, the digitized signature is converted to analog form when a copy of the application is printed in the central office. A signed copy of the application is thus provided to the company electronically.

Following the "save info" step at 342, a screen at 350 thanks the customer and bids the customer goodbye. Then, at 352, the terminal goes to point A (FIG. 4A), again displaying "Attraction Screen 1" at 104.

Module B is shown in FIG. 4H. This module is used to obtain personal data about a customer, who has not qualified for some reason for a sale by terminal 10, to be used for follow-up by a salesman. At 354, a screen requests the customer's first name. At 356 and 358, screens request the customer's middle name and last name. Screens 360, 362, 364 and 366 request the customer's street address, city, state and zip code. A screen at 368 requests the customer's social security number. At 370, the customer's telephone number is requested. As the customer keys in the personal data requested, the data is stored in assigned personal data buffers. The terminal then goes at 372 to module J (FIG. 4J) to obtain personal information about the customer's beneficiary for use in the follow-up.

Figure 4J:
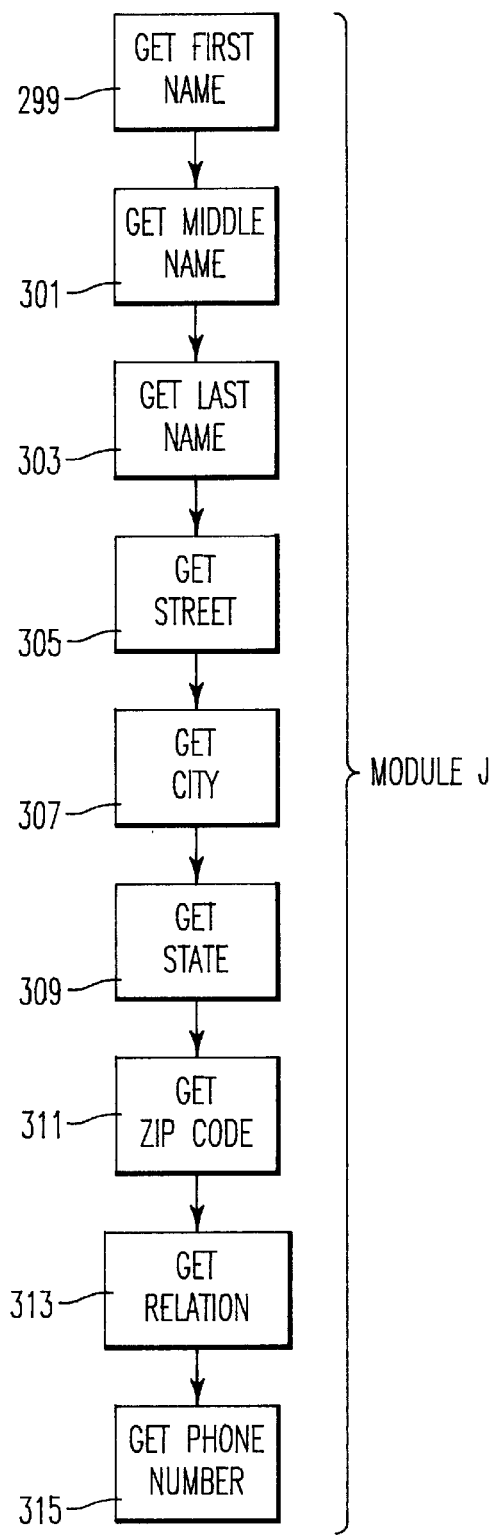
Figure 4I:
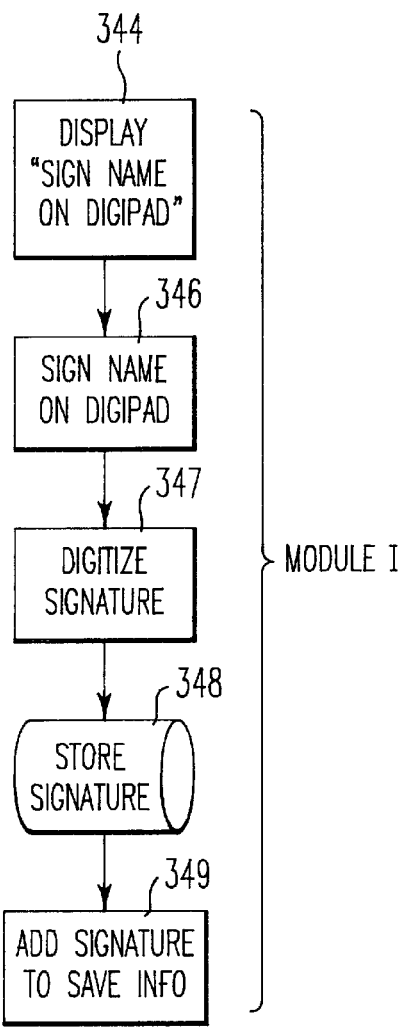

As seen in FIG. 4J, screens at 299, 301, and 303 ask the customer to enter the first name, middle name and last name of his or her beneficiary and, at 305, 307, 309 and 311, the beneficiary's street address, city, state and zip code. The beneficiary's relation to the customer is requested by a screen at 313, and the beneficiary's phone number is requested at 315. As the customer keys in the personal data requested in module J, the data is stored in assigned personal data buffers.

The data from modules B and J is stored in a "following info" buffer at 374. A follow-up file is then created at 376 and is printed out by printer 44 for later pickup by service personnel. The follow-up data is then saved in storage at 378. The terminal again thanks the customer and bids the customer goodbye at 350 and returns to point A at 352.

Point C leads the system from the "arrange other mode of payment" at 322 to the follow-up file at 376. Again, the follow-up file is printed out by printer 44 and is stored at "save data" at 378. The customer is thanked and bid goodbye at 350. The system then returns to point A at 352.

Figure 5:
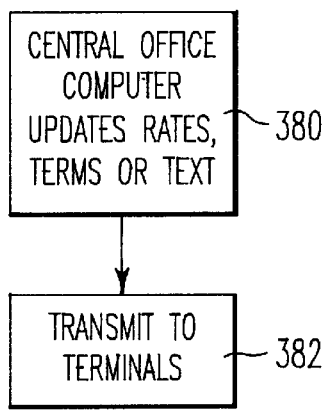
FIG. 5 is a flow chart showing the update operation of the system.

As shown in FIG. 5, the computer 56 at the central office updates premium rates and insurance terms and text at 380 and transmits these changes to the terminals 10 at 382. The data on hard disk drive 40 is then updated.

Figure 6:
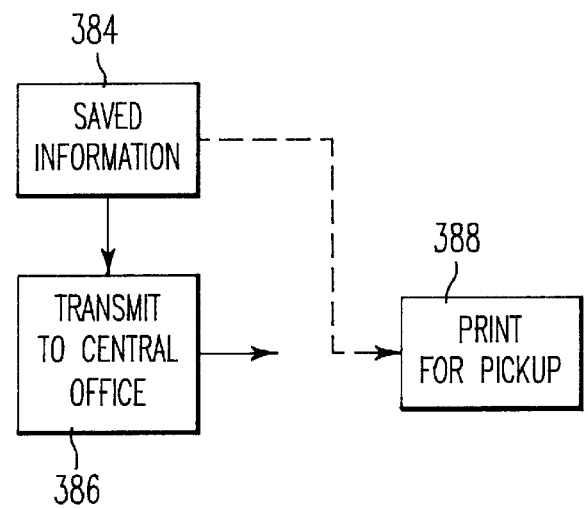
FIG. 6 is a flow chart showing how information is transferred to the central office.

As shown in FIG. 6, the saved information 384 stored at 342 and 378 (FIG. 4H) is transmitted to the central office at 386. Alternatively, the saved information at 384 is printed by the journal printer 44 or stored on a floppy disk of drive 36 for later pickup at 388.

Although the invention has been shown incorporated in a stand-alone terminal based on a NCR self-service terminal, model NCR 5682, it may also be incorporated in hardware with other configurations. For example, the terminal may be based on a lap top computer, a pen computer, a briefcase computer, or a notebook computer, using input by stylus and menus. The terminal may be provided with a handwriting reader so that a handwritten input may be used. The terminal may communicate with a telephone network by means of an RF transmitter, such as that provided in a cellular telephone. If necessary, such configurations could use an agent to assist the customer.

While this invention has been particularly shown and described with reference to preferred embodiments, it will be appreciated by those of ordinary skill in the art that various modifications and changes may be made without departing from the spirit and scope of the invention.

What is claimed is:

1. A stand-alone interactive self-service kiosk for underwriting, creating and issuing insurance policies directly to customers without external authorization, said kiosk comprising:

a kiosk housing;

a data base in the kiosk housing for storing data as to available insurance policies, insurance premiums, insurance eligibility criteria, insurance underwriting criteria, insurance policy texts, insurance policy application data, policies sold, and receipts;

an interactive multimedia device in said kiosk housing operable for conducting a dialogue with the customer, without any external control;

a computer in said kiosk housing for, in response to the interactive multimedia device:

establishing a customer's initial eligibility for insurance based on dialogue with the customer and on insurance underwriting criteria stored in said data base, quoting premiums for an amount and time period of coverage indicated by the customer during said dialogue, determining whether said customer meets more stringent underwriting criteria for said particular coverage indicated by the customer during said dialogue, and soliciting a decision by said customer as to purchase of insurance for which said customer is eligible and for which the customer has met the underwriting criteria;

a device for receiving a customer's payment card for payment of the insurance;

a verification system for capturing information corresponding to the person taking out the insurance policy, said verification system includes a device for capturing a signature of the customer on a copy of final, issued insurance policy;

a printer in said kiosk housing for printing a final, issued insurance policy for said insurance, conditioned on full payment by the customer;

a device in said kiosk housing for delivering said printed final, issued insurance policy to said customer through the kiosk housing;

said device for capturing said customer's signature on a copy of said final, issued insurance policy comprises a device for causing said printer to Print said final, issued insurance, said printed final, issued insurance policy having a customer's copy portion and an insurance company's copy portion and, after said final, issued insurance policy is delivered to said customer at the kiosk, causing said interactive multimedia device to instruct the customer to separate said printed final, issued insurance policy into said customer's copy portion and said insurance company's copy portion, to keep the customer's copy portion, to sign the insurance company's copy portion and to return the signed insurance company's copy portion to said kiosk; and a memory in said kiosk which stores captured information and other information obtained through dialogue with the customer regarding the insurance coverage.

2. The kiosk as recited in claim 1, wherein:

the device for capturing the customer's signature further includes a signature digitizer module which produces a digitized signal corresponding to a signature of the customer when the customer signs on the signature digitizer module;

said signature digitizer module includes:

a signature pad on which the customer signs his or her name, and a unit for digitizing the customer's signature in response to signing of the customer's name on the signature pad, said computer instructs the customer through the interactive multimedia device to sign his or her name on said signature pad, and said memory stores said data as to said final, issued insurance policy, the underwriting criteria and said digitized signature.

3. The kiosk as recited in claim 2, further comprising:
a unit for electronically sending said final, issued signed copy of said insurance policy to an insurance company at an external location, said unit for directing including a modem for electronically transmitting a copy of said final, issued signed insurance policy to said insurance company at said external location.

4. The kiosk as recited in claim 1, wherein said memory comprises a removable disk drive for storing said final, issued signed copy of said insurance policy on a removable disk for periodic collection by personnel of said insurance company.

5. The kiosk as recited in claim 1, further comprising:
a unit for periodically placing said kiosk "on-line" with an insurance company at an external location for uploading to a computer at said external location from said kiosk stored data as to said final, issued insurance policy and the underwriting criteria and for downloading from said computer at said external location to said kiosk updates for updating the data base as to insurance policies available, eligibility criteria, prices of available policies, underwriting criteria and text of insurance policies to be issued.

6. The kiosk as recited in claim 1, wherein said initial insurance eligibility criteria include age criteria establishing a minimum and a maximum age for eligibility for an insurance policy, and wherein said computer in said kiosk compares an entered age with said minimum and maximum ages, and if said entered age falls below the minimum age or above the maximum age, said computer in said kiosk determines that said customer fails an initial eligibility test.

7. A kiosk as recited in claim 1, wherein said data base stores a lookup table as a continuous data stream comprising a plurality of successive words each having a customer's age, a set of coverage options indicating values of the coverage provided by a policy, a series of sets of premiums to be paid by the customer, each set of premiums corresponding to a term option determining a length of the term of a policy and each premium in a set corresponding to a value of the coverage;
wherein said interactive multimedia device requests that the customer's age be entered and that the customer choose a coverage option;
wherein said computer in said kiosk cuts up said data stream and, in response to said customer's age and said chosen coverage option, assembles a word comprising said customer's age, said chosen coverage option and an assembled group of premiums to be paid by the customer, each premium of said assembled group being cut from one of said sets of premiums and correspond to said customer's age and said chosen coverage option, each premium in said assembled group corresponding to a different one of said term options; and
wherein said memory comprises a buffer for storing said assembled word.

8. A kiosk as recited in claim 7, wherein
said interactive multimedia device requests said customer to choose a term option;
said computer in said kiosk, responsive to the term option chosen by the customers, selects a premium from said assembled group of premiums corresponding to said chosen term option; and
said memory further comprises a buffer for storing said customer's age, said chosen coverage option, said chosen term option and said selected premium.

9. The kiosk as recited in claim 1, wherein said memory further comprises a print buffer and said printer comprises a unit for assembling the text of said final, issued insurance policy in said printer buffer from standard text stored in said data base and from said customer's responses in said dialogue.

10. The kiosk as recited in claim 1, wherein said more stringent underwriting criteria include a series of medical question comprising height and weight criteria of the customer.

11. A method of operating a kiosk for underwriting, creating and issuing insurance policies directly to customers without external authorization, said kiosk including a kiosk housing; a data base in the kiosk housing for storing data; an interactive multimedia device operable for conducting a dialogue with the customer, without any external control; a computer in said kiosk for processing data; a device for receiving a customer's payment card for payment of the insurance; a verification system for capturing information corresponding to the person taking out the insurance policy; a printer in said kiosk; and a memory in said kiosk which stores captured information and other information obtained through dialogue with the customer regarding the insurance coverage, said method comprising the steps of:
storing data in said data base as to available insurance policies, insurance premiums, customer eligibility criteria, insurance underwriting criteria, insurance policy texts, insurance policy application data, insurance policies sold and receipts;
undertaking a dialogue via said interactive multimedia device with said customer at said kiosk with said kiosk "off-line" from any external computer, and
during said dialogue:
establishing a customers' initial eligibility for insurance based on dialogue with the customer and on insurance underwriting criteria stored in said data base,
quoting premiums for an amount and time period of coverage age indicated by the customer during said dialogue,
determining whether said customer meets more stringent underwriting criteria for said particular coverage indicated by the customer during said dialogue, and
soliciting a decision by said customer as to purchase of insurance for which said customer is eligible and for which the customer has met the underwriting criteria;
printing a final, issued insurance policy for said insurance, conditioned on full payment by the customer;
delivering said printed final, issued insurance policy to said customer through the kiosk housing; and
capturing information and other information obtained through dialogue with the customer regarding the insurance coverage; and
said step of printing includes the steps of;
printing said final, issues insurance policy with a customer portion and a source copy portion,
instructing said customer to separate said portions by said interactive multimedia device,
instructing said customer to sign the source copy portion, and
instructing maid customer to deposit said signed copy portion to said kiosk.

12. A method as recited in claim 11, wherein said kiosk further includes a signature digitizing module which includes a signature pad, and a unit for establishing an on-line communication link between said terminal and a computer at an external location, and said method further comprises the steps of:
- instructing the customer to sign his or her name on said signature pad,
- thereupon digitizing the customer's signature by the module,
- storing said digitized signature in said memory at said kiosk in connection with the elected document, and
- uploading said captured and other data and said digitized signature to said computer at said external location to electronically deliver a signed copy of said final, issued insurance policy to said computer at said external location.

13. A method as recited in claim 12, further comprising the step of recording said captured and other data and said digitized signature on a removable disk.

14. The method of claim 11, wherein said kiosk further includes a unit for establishing an on-line communication link between said kiosk and a computer at an external location, and said method further comprises the step of placing said kiosk "on-line" periodically with said computer at said external location for uploading to said computer at said external location stored data as to customer transactions and for downloading to said kiosk updates for storage in said data base as to documents available, acceptance criteria, prices of available documents and text of documents.

15. A method as recited in claim 11, wherein said initial insurance eligibility criteria comprises age criteria establishing a minimum and a maximum age for eligibility for an insurance policy, and further comprising the step of comparing said entered age with said minimum and maximum age criteria, and if said entered age falls below the minimum age or above the maximum age, said computer in said kiosk determines that said customer fails an initial eligibility test and the kiosk advises said customer that he or she is not eligible.

16. The method as recited in claim 11, wherein said more stringent underwriting criteria include a series of medical questions comprising height and weight criteria and other personal health data of the customer.

* * * * *